United States Patent
Russ, Sr.

[11] 3,837,714
[45] Sept. 24, 1974

[54] ENDLESS TRACK SUSPENSION SYSTEM
[75] Inventor: Paul E. Russ, Sr., Englewood, Colo.
[73] Assignee: The Gates Rubber Company, Denver, Colo.
[22] Filed: June 21, 1973
[21] Appl. No.: 372,439

Related U.S. Application Data
[62] Division of Ser. No. 48,587, May 14, 1970, Pat. No. 3,761,143.

[52] U.S. Cl. ............... 305/24, 305/27, 180/5 R
[51] Int. Cl. ........................... B62m 27/02
[58] Field of Search ............ 305/24, 27, 35 EB; 180/5 R

[56] References Cited
UNITED STATES PATENTS

| | | | |
|---|---|---|---|
| 1,438,859 | 12/1922 | Rimailho | 305/24 |
| 2,184,441 | 12/1939 | Smellie | 305/35 EB |
| 3,204,982 | 9/1965 | Loughary | 305/24 X |
| 3,485,312 | 12/1969 | Swenson | 305/24 X |
| 3,527,506 | 9/1970 | Erickson | 180/5 R |
| 3,637,035 | 1/1972 | Washburn | 180/5 R |

*Primary Examiner*—Richard J. Johnson
*Attorney, Agent, or Firm*—H. W. Oberg, Jr.; Raymond Fink; Curtis H. Castleman, Jr.

[57] ABSTRACT

A wheel and slide suspension system for supporting or aligning a flexible and endless track from a wheel substitute vehicle used over various types of terrain and climatic conditions. Under hard-packed terrain conditions, wheels support the track away from the slide; and under soft terrain conditions, the track deflects to a position to engage and receive support from the slide. Lugs projecting from the track are engagable with the slide to maintain the track in longitudinal alignment.

2 Claims, 12 Drawing Figures

ENDLESS TRACK SUSPENSION SYSTEM

This is a division of U.S. Pat. application Ser. No. 48,587, filed on May 14, 1970, now U.S. Pat. No. 3,761,143.

BACKGROUND OF THE INVENTION

This invention relates to wheel substitute vehicles, but more particularly, the invention relates to suspending and aligning a flexible and endless track from a vehicle with a combination of wheels and slide bars to control frictional or drag losses while maintaining adequate support to the track.

Prior art suspension systems for snowmobiles or all-terrain vehicles are of either the multi-wheel or slide-bar type. Multi-wheel suspension systems generally provide adequate support and guiding to flexible and endless tracks used over packed and relatively smooth terrain. Characteristically a wheel can only support a track at its point of rolling contact. Consequently, when a track having a multi-wheel suspension system is used over soft terrain such as unpacked snow, the track must bridge the spacing between wheels. Bridging the space between wheels causes the track to deform and undulate or ripple as it is propelled. Wheels must be added to support the track and keep internal stresses within tolerable limits. The added wheels tend to increase the frequency of track undulations. Wheels added to support a track for use over soft terrain are redundant when compared to a track used over packed or relatively smooth terrain. Redundant wheels complicate the drive system by increasing the number of places where snow, ice or debris may accumulate to foul the drive system.

Slide-bar suspension systems are advantageously used to provide lineal support to and minimize undulations in flexible and endless track. Typically, prior art slide-bar suspension systems require metal elements as part of the flexible track. The metal elements run against plastic slide-bars to reduce frictional losses and abrasion.

The prior art slide systems require repeated external lubrications from snow, ice, water or the like to insure adequate track life. Tracks supported by slide-bars have holes near the slide area for ingress of a lubricating agent such as snow, ice or water. The lubricating agent cools the sliding surfaces and reduces friction therebetween. Thus, when prior art slide suspensions are propelled over abrasive or non-lubricating terrain such as dirt, sand or rocks, abrasive material enters the area near the slide. The abrasive material promotes erosion of the track and slide-bar to a point of failure or the frictional losses become large enough to stop the drive system. Consequently, vehicles employing prior art slide systems are somewhat limited in the types of terrain over which they may be used when drive system stoppage and prolonged life of the track or slide-bar are considered.

Another problem with some prior art slide systems is maintaining track alignment when external forces are applied laterally against the track. Application of lateral forces cause the track to slip laterally with respect to the slide and thus, reduces lateral control or stability of vehicle on which the track is being used.

SUMMARY OF THE INVENTION

In accordance with the invention there is provided a wheel and slide-bar system that supports, suspends and guides flexible and endless track of a vehicle. Wheels support the track in a neutral position away from the slide-bars. The wheels provide direct support to the track when the vehicle is operated over a packed terrain such as a road, ice, packed snow or other such terrain. The slide bars provide support to the track when the track is moved to a position of engagement with the slide-bars. This slide-bar support is provided to the track when the vehicle is operated over soft and relatively unsupporting terrain such as new fallen snow, mud, sand and similar soft surfaces. The slide bars also provide lateral support to a laterally deflected track by engaging a plurality of lugs which project from the inner surface of the track.

It is, therefore, an object of this invention to provide a slide type suspension system which is operable over lubricating or abrasive terrain.

Another object of this invention is to provide a slide-type suspension which does not require inclusion of metal sliding surfaces on or apertures through a flexible and endless track.

And another object of this invention is to provide a slide arrangement that enhances self-lubrication under certain terrain conditions.

Still another object of this invention is to provide a slide-type suspension system which provides longitudinal alignment to flexible and endless track.

Yet another object of the invention is to provide a slide bar arrangement which promotes damping of undulations in a flexible track.

Another object of the invention is to provide a slide system which is activated by demanding terrain conditions.

And another object of the invention is to provide a slide-bar arrangement which does not require the use of plastic over the slide bar to minimize the effects of sliding friction on the track.

Other advantages or objects of the invention will become apparent upon review of the drawings and description thereof wherein.

TECHNICAL DISCLOSURE

A preferred embodiment of the invention which fulfills the aforementioned objectives is illustrated in FIGS. 1 through 6. The suspension system improvement is denoted by the numeral 10 and is shown mounted to a vehicle 12 of the snowmobile type. The invention may also be adapted to other vehicle types such as twotrack all-terrain vehicles.

The influential elements which relate to improved suspension system performance include a wheel, a slide-bar and optionally, a plurality of lugs arranged in parallel rows along the inner surface of a flexible and endless track. The wheel and slide-bar coact to provide normal support to a track and resultant normal support to the vehicle, whereas the slide-bar and lugs react to provide a lateral support to the track and a resultant lateral support to the vehicle. The wheel and slide-bar features of the suspension may be used independently of the lugs.

Figure 1:
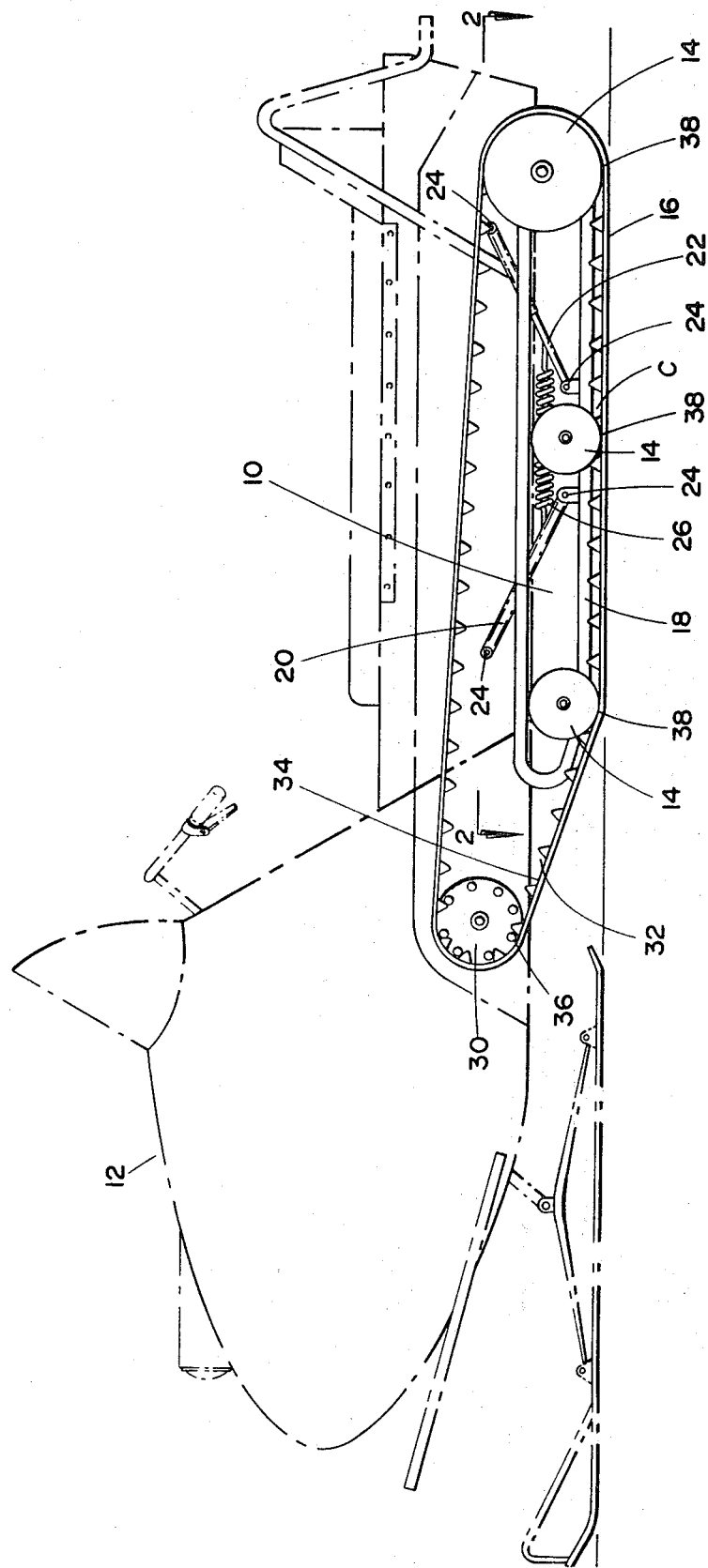
FIG. 1 is a side view of a preferred embodiment of the invention as adapted to a snowmobile, shown with a side panel broken away.
Figure 2:
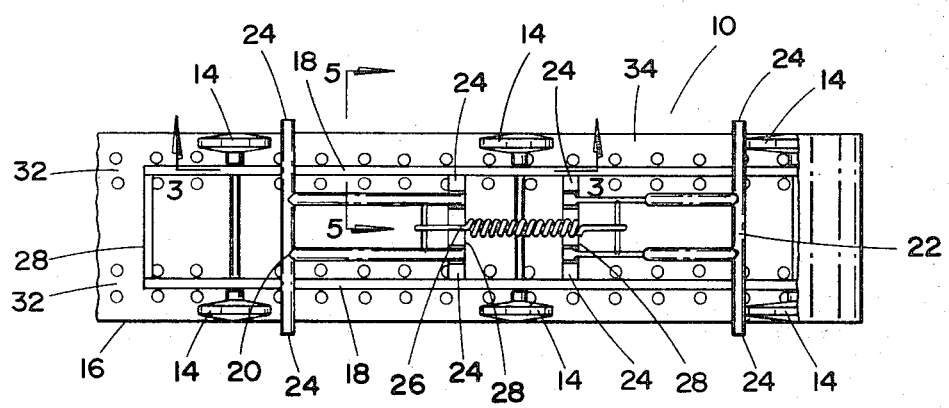
FIG. 2 is a plan view taken along the line 2—2 of FIG. 1.
Figure 3:
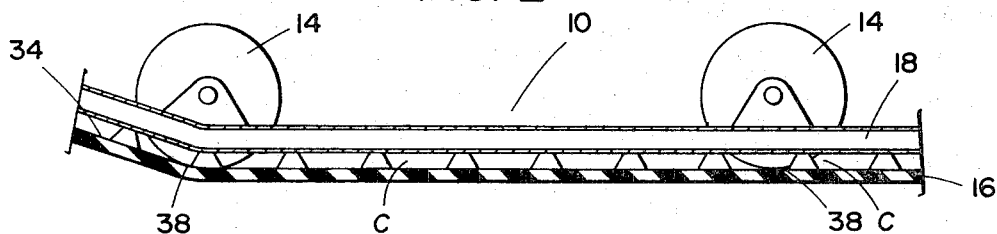
FIG. 3 is an enlarged side view taken along the line 3—3 of FIG. 2 depicting the suspension system in use over flat or hard-packed terrain.

Referring now to FIGS. 1 and 2, a plurality of wheels 14 are axially mounted to rotate against a track 16 in a longitudinal direction. Slide-bars 18 are mounted in a longitudinal orientation with respect to the vehicle 12 and the track 16. The relative position of the wheels 14 and slide bars 18 with respect to the track 16 is or prime importance. The wheels 14 are mounted to hold the track 16 in a nominal position away from the slide bars 18 to provide a clearance $c$ between the track and the slide bar. The amount of clearance $c$ may vary depending upon the number of wheels used, the type of terrain traversed and the geometry of the suspension system, which will be later explained. For most purposes, a clearance between 0.1 and 0.8 inches has proven satisfactory whereas a clearance of 0.25 inches is adequate for the suspension system of FIGS. 1 through 6. It should be noted that some tracks have ridges or steps projecting recessed along their inner surface. The relative position between the slide bar and wheels mounting may be varied to provide the desired clearance. The intended use of the vehicle influences the preferred amount of clearance. For example, a suspension system designed for primary use over hard and abrasive terrain should have a greater clearance $c$ than a suspension system predominantely used over unpacked snow.

The frame means used to mount the slide-bar and wheels to the vehicle may be of any desired geometrical arrangement provided the wheels nominally hold the track in a position away from the slide bars. The wheels and slide-bars may be independently suspended from the vehicle by the same frame; or as shown in FIGS. 1 – 6, the slide-bars 18 may be independently suspended from the vehicle 12 and the wheels 14 dependently mounted to the slide-bars. It is preferred to mount the wheels directly to the slide-bars since in this situation the clearance $c$ near the wheel 14 remains constant as opposed to being variable as it is in alternate suspension arrangement $s$.

The slide bars 18 are suspended from the vehicle by forward 20 and rearward 22 frame members. The frame members are attached to the vehicle 12 and to the slide bars 18 with pivotal mounts 24. The rearward frame members 22 are telescopic or collapsible. As may readily be understood, when the slide bars are deflected toward the vehicle, all frame pivot points and the telescopic joints are activated. The wheels 14 being dependently mounted to the slide bars by axles move with the slide bars; consequently, the clearance $c$ near each wheel remains constant. Spring members 26 bias the frame members, and resultantly, the slide bars and wheels, in a direction away from the vehicle. Therefore, the wheels are in constant engagement with the inner surface of the track. The telescopic rear frame members 22 have spring members not shown, which bias the frame members to the extended position. Cross bars 28 reinforce or maintain the slide bars in parallel alignment.

When the suspension system is in use, a rotatable drive wheel 30 mounted to the vehicle 12 engages and propels the track. The drive system as illustrated is of lug type although other types of drive systems may be used. A pair of parallel rows of lugs 32 project from the inner surface 34 of and are longitudinally aligned with the track. Tangs 36 of the drive wheel 30 engage successive lugs to propel the track 16. The use of the lug drive system is preferred because the lugs may serve a dual purpose by also being activated by the slide-bars 18 which will be later explained.

Should the suspension system be used over packed and smooth terrain, only the wheels 14 provide direct support to the track. As exemplified by FIGS. 1 through 3, the vehicle receives support from the track 16 through the mechanics of a load being transferred from the vehicle 12, through the frame 20, 22 and spring member 26, and to the wheels 14 which directly engage and support the track at points of rolling contact 38. In this situation, the slide bars do not provide direct support to the track of resultant support to the vehicle. However, the slide-bars may intermittently engage the track to smooth out undulations or vibrations which may occur in the track as it is being propelled. Since only a minimum amount of contact takes place between the slide-bars and the track, it is readily understood that drag forces on the track are minimal. If the terrain should also be abrasive, the clearance $c$ provides an avenue of escape for any abrasive particles to help keep drag forces on the track minimum.

Figure 4:
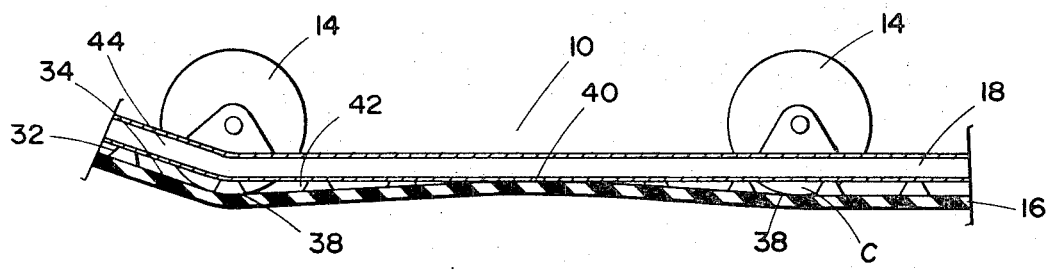
FIG. 4 is a view similar to FIG. 3 but showing the suspension system in use over soft or irregular terrain.

Should the suspension system be used over soft or irregular terrain, the wheels 14 and slide bars 18 coact to provide direct support to the track as exemplified by FIG. 4. The vehicle receives support from the track through the mechanics of a load being transferred from the vehicle, through the frame and spring member, and to the wheels and slide-bars which in combination support the track. The soft terrain cannot support the track directly under 38 the wheels 14 as pressure exerted by the track is greater than the terrain can withstand. The high pressure of the track directly under the wheels causes the track thereunder to sink slightly into the soft terrain. The terrain reacts against the area of track between the wheels causing the track to deflect to a position of engagement 40 with the slide-bars 18. Thus, the slide bars are automatically engaged or disengaged by the terrain.

Figures 5, 6:
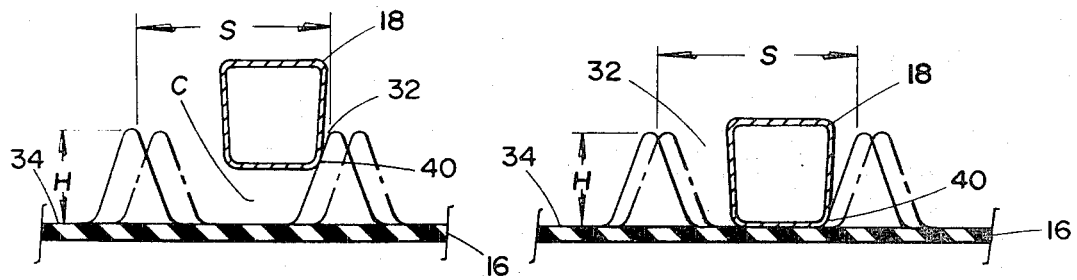
FIG. 5 is a view taken along the line 5—5 of FIG. 2.
FIG. 6 is a view similar to that of FIG. 5 but showing the track in a deflected position.

Heretofore, the operation of the suspension has been explained for situations where no lateral side forces have been induced into the track. Side forces may be readily induced into the track during vehicle turning or when the vehicle is operated on a side hill. Referring to FIGS. 5 and 6, relative positions between the track 16 and slide bars 18 are shown. The figures show a neutrally aligned track in dotted form and a track laterally deflected to a position against a row of lugs 40. FIG. 6 further shows the track 16 in a deflected position against the slide bar 18 as when operating over soft terrain. The lugs should have sufficient height H to insure engagement with the slide bars 18 when the track 16 is not deflected toward the vehicle an amount equal to the clearance c, FIG. 5. The spacing s between the lugs is sufficient to allow a clearance on either side of the slide bar. When the track is laterally deflected, the lugs react 40 against the slide bars 18 and keep the track 16 in alignment for engaggement with the drive system. Keeping the track in alignment also gives stability to the vehicle and prevents the track from being disengaged from the slide bars 18. The similarity in the track being laterally deflected to engage the lugs with the slide-bars, and the track being deflected toward the vehicle should be noted. The slide bar does not make contact with the lugs or the track unless so induced by the terrain. Hence, drag forces imparted to the track are minimized.

A preferred embodiment is to use the same lug rows 32 for both propelling and laterally guiding the track. Separate lug rows may be used as desired for each slide-bar. Only two rows of lugs are needed to provide lateral guiding to the track in two directions whether one or more slide bars are used.

The suspension has inherent features which both enhance or eliminate the need for lubrication depending upon terrain conditions. When the track 16 is in the position depicted by FIG. 3, there is no need to lubricate the slide bars 18. The terrain may be either abrasive such as a dirt road or the terrain may be lubricating such as a snow packed frozen lake. With the slide bar 18 away from the track 16, there is no need for constant lubrication.

When the track is in a position as depicted by FIG. 4, the slide bars usually recive sufficient lubrication from the traversed terrain. Usually, the terrain is soft because it contains moisture. The moisture may be in the form of snow, ice or water. The moisture is able to enter the slide area through the funnel shaped gap 42 initiated by the wheel 14 and defined by the slide-bars 18 and track 16. Should it be desired to use the suspension entirely over a lubricating terrain such as soft or hard packed snow, only one wheel need be used at the leading end 44 of the slide bar 18 to take advantage of inducing lubrication through the funnel shaped gap 42.

Here it should be emphasized that the suspension does not require metal clips in the track or any specially shaped plastic shoe that fits over the slide bars to reduce friction between the slide-bars and track. Also, there is no need for holes in the track juxtaposed to the slide bars to permit ingres of a lubruicant to the slide bars.

From the foregoing description it is readily understood that a vehicle equipped with the invention may be advantageously used over all types of terrain whereas a vehicle equipped with a slide bar that constantly engages a track is limited to use over lubricating type terrain.

ADDITIONAL SPECIES

Additional species of the suspension system are presented in FIGS. 7 through 12. All species have the inherent feature of a wheel 14 holding a track 16 in a position away from a slide bar. Various means for mounting the wheel and slide bar while still maintaining the features of the invention are shown.

Figure 7:
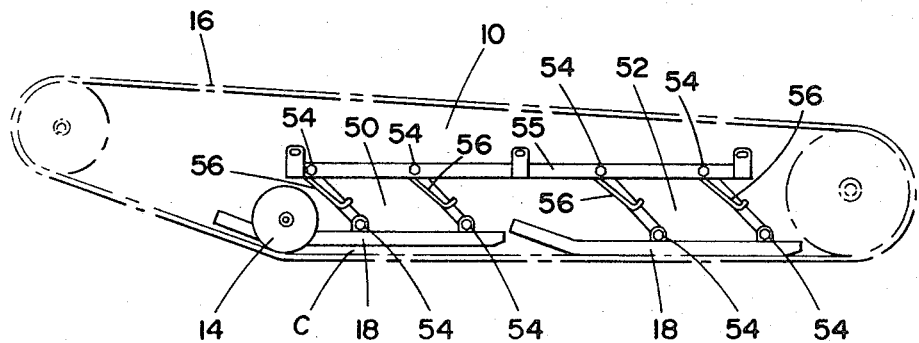
FIG. 7 is a side view showing an alternate form of the invention.
Figure 8:
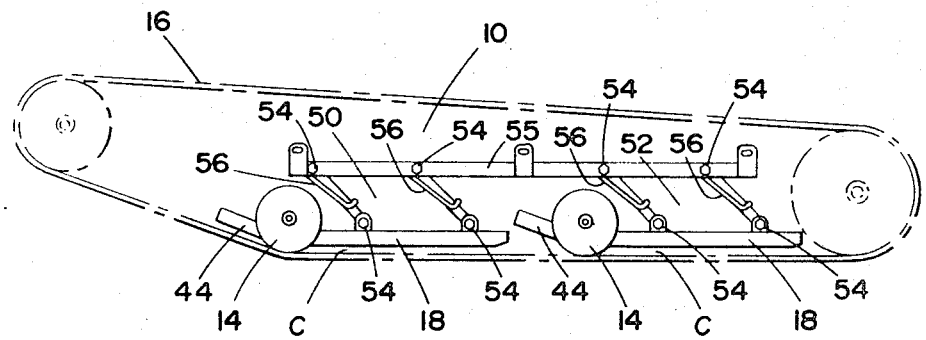
FIG. 8 is a side view showing an alternate form of the invention.
Figure 9:
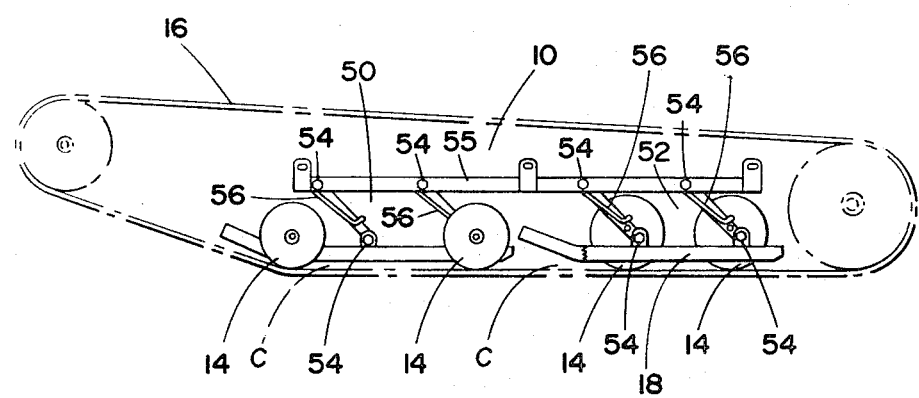
FIG. 9 is a side view showing an alternate form of the invention.

Referring to FIGS. 7, 8 and 9, suspension systems having similar frame means are shown. The various mounting locations for the wheels are indicative of the broad variations available within the scope of the invention. Two sets of slide bars 50, 52 have forward and rearward frame members for mounting to a vehicle. The frame members have pivotal mounts 54 for attachment to the slide bars and to a vehicle. The pivotal mounts 54 may attach directly to a vehicle or to another frame member 55 which attaches to a vehicle. Spring members 56 are mounted to urge the frame members, and resultantly, the slide bars 18, to an extended position. The slide bars and frame members form a pseudo parallelogram. Accordingly, the slide bars move up and down in a parallel fashion as the frame members are pivoted or deflected.

In FIG. 7, a wheel 14 is mounted near the leading end of each forward slide bar. The wheels are mounted to hold the track in a position away from the slide bars and define a clearance c between the slide bars 18 and a track 16. Because of the parallelogram mounting arrangement, the clearance c is somewhat maintained along the length of the forward slide bar. The clearance c defines a channel for inducement of lubricating terrain to the slide bars. Use of only one wheel mounted in relation to the slide bar is recommended where the suspension system is used over lubricating terrain since one wheel will not independently support a vehicle. The advantage of a simple wheel system is improved lubrication to the slide area when used over a lubricating terrain.

FIG. 8 depicts a suspension system similar to that of FIG. 7 except that an additional set of wheels have been added. A wheel 14 is mounted near the leading end 44 of each slide bar 18. The wheels are mounted to hold a track away from the slide bars and thereby define a clearance c. The parallelograph type suspension permits the clearance to be substantially maintained along the length of each slide bar 18. This type of suspension is recommended for primary use over lubricating terrain but may be used also over abrasive terrain.

FIG. 9 depicts a suspension system similar to that of FIGS. 7 and 8 except that additional wheels 14 have been added to permit extended use over either lubricating or abrasive type terrain. The wheels of the rear slide bars have been mounted to the frame members 52 to emphasize various wheel mounting means. All wheels hold the track in a nominal position away from the slide bars and define a clearance c. The system operates in a manner similar to that as previously explained.

Figure 10:
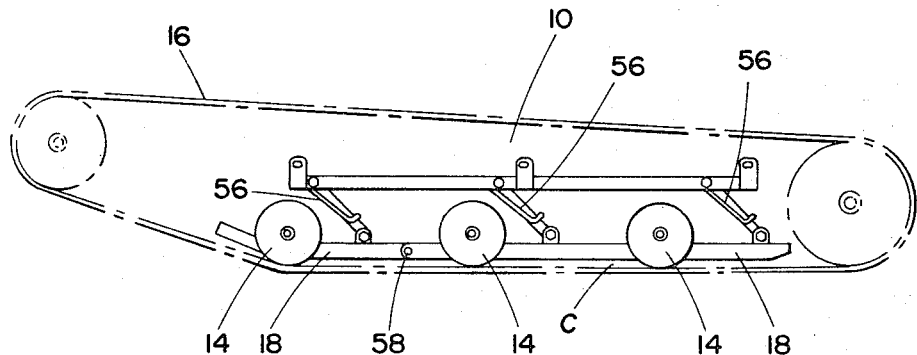
FIG. 10 is a side view showing an alternate form of the invention.

FIG. 10 shows still another arrangement that may be used between the slide bars and wheels. The slide bars are of two pieces and are pivotally attached 58 to each other. A wheel 14 is mounted near the pivot point 58 to each other. A wheel 14 is mounted near the pivot point 58 to hold the track 16 away from the slide bar 18. The wheels 14 and slide bars 18 coact in a manner similar to that as previously explained to hold the track 16 a clearance c away from the track 16.

Figure 11:
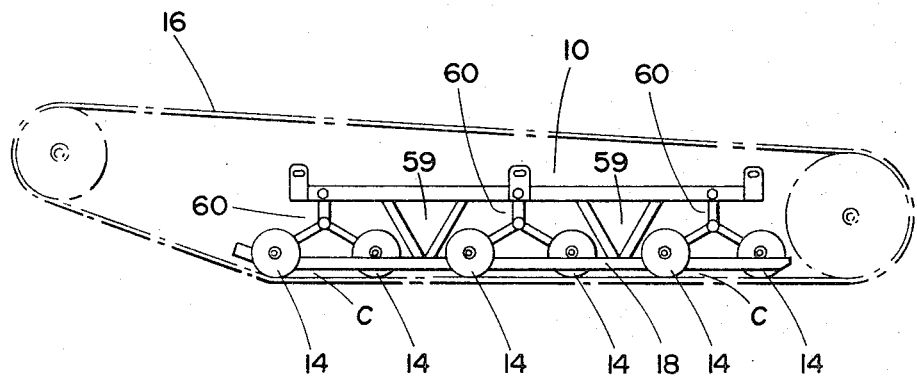
FIG. 11 is a side view showing an alternate form of the invention.
Figure 12:
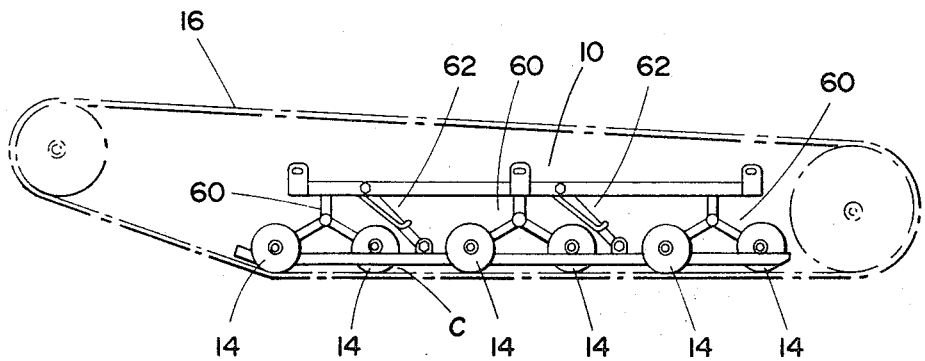
FIG. 12 is a side view showing an alternate form of the invention.

FIGS. 11 and 12 are exemplary of additional ways of dependently or independently mounting wheels 14 and slide bars 18. Referring to FIG. 11, the slide bars are rigidly mounted 59 whereas the wheels 14 have frame members 60 for independent mounting to a vehicle.

Here again, the wheels hold the track 16 in a biased position away from the slide bars 18 to define a clearance c.

FIG. 12 shows the slide bars 18 and wheels 14 with frame members for independent mounting. Both wheel 60 and slide 62 frame members allow for deflection independent of each other. However, the wheels 14 are biased in a position away from the slide bars and hold the track away from the slide bars and define a clearance c.

The foregoing detailed description was made for the purpose of illustration only and is not intended to limit the scope of the invention which is to be determined from the appended claims.

What is claimed is:

1. A slide type suspension system for supporting and aligning a flexible and endless track, having an inner surface, from a wheel substitute vehicle, comprising:
    two pair of spaced-apart but substantially parallel rows of spaced-apart lugs, having slide-engageable surfaces, protruding from and longitudinally, aligned along the inner surface of the track, the space between a pair of lug rows defining a first and second slide receiving runway on the inner surface of the track;
    two slide-bars having leading and rearward slide portions and substantially co-planar track engaging portions, one slide-bar aligned above and engageable with the first slide-receiving runway and the other slide-bar aligned above and engageable with the second slide-receiving runway, said slide-bars juxtaposed to and engageable with the slide engaging surfaces of said lugs and the slide-bar track engaging portions capable of engaging and lending support to portions of the track at the first and second slide receiving runway;
    at least one wheel near the leading and rearward portions of each slide-bar, said wheels arranged to rotate in a longitudinal direction along and contact the inner surface of the track;
    means for rigidly suspending said slide-bars from the vehicle;
    means for suspending said wheels from the vehicle to have said wheels normally support the track at the runways away from and substantially throughout the length of said slide-bars, the wheel suspending means deflectable away from and toward the vehicle; and
    spring means for biasing said wheel suspension means away from the vehicle;
    whereby said wheels constantly contact the inner surface of the track and on soft terrain, a portion of the track engaging surface of said slide-bars and free to intermittently or normally constantly engage the runways on the inner surface of the track when the track is deflected relatively to the track engaging surfaces and said slide-bars and free to engage slide-engaging surfaces of said lugs and keep the track in alignment when the track is deflected laterally relative to said slide-bars.

2. A slide-type suspension for supporting a flexible and endless track, having an inner surface, from a snowmobile type vehicle, comprising:
    at least two spaced-apart but substantially parallel slide-bars, each having leading portions, rearward portions, and substantially co-planar track engaging surfaces, the slide-bars aligned with and capable of engaging the inner surface of and leading support to the track away from the edges of the track;
    a plurality of wheels longitudinally aligned in relation to the track, a wheel near the leading and rearward portions of each slide-bar, said wheels having diameters greater than the width of the slide-bars and of themselves and said wheels arranged to rotate in a longitudinal direction along and contact the inner surface of the track;
    means for rigidly suspending said slide-bars from the vehicle; and
    means for deflectably suspending said wheels from the vehicle to have said wheels normally extend beyond the substantially co-planar track engaging surfaces to normally support the track away from and substantially throughout the length of the slide-bars defining a normally positive clearance of generally 0.8 inch or less between the track and slide-bars when the track is used over flat hard, terrain;

whereby said wheels constantly contact the inner surface of the track, and on soft terrain portions of the track engaging surfaces between the wheels are free to intermittently or normally engage the track when the track is deflected to the track engaging surfaces.

* * * * *